(12) United States Patent
Sidorovich Paradiso (10) Patent No.: US 10,648,510 B1
(45) Date of Patent: May 12, 2020

(54) BAFFLE FOR INSTALLATION INSIDE A BEARING CHAMBER OF A GAS TURBINE ENGINE

(71) Applicant: PRATT & WHITNEY CANADA CORP., Longueuil (CA)

(72) Inventor: Ivan Sidorovich Paradiso, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/162,785

(22) Filed: Oct. 17, 2018

(51) Int. Cl.
*F16C 33/66* (2006.01)
*F01D 25/18* (2006.01)

(52) U.S. Cl.
CPC ........ *F16C 33/6677* (2013.01); *F01D 25/183* (2013.01); *F05D 2220/32* (2013.01); *F05D 2240/60* (2013.01)

(58) Field of Classification Search
CPC .............. F16C 33/6659; F16C 33/6677; F16C 2360/23; F01D 25/125; F01D 25/18; F01D 25/183; F16N 2210/14
See application file for complete search history.

(56) References Cited

U.S. PATENT DOCUMENTS

| | | | |
|---|---|---|---|
| 2,681,837 A * | 6/1954 | Boyd | F01D 25/183 384/466 |
| 3,085,838 A | 4/1963 | Patterson | |
| 3,243,243 A * | 3/1966 | Diver | F01D 25/18 384/465 |
| 3,779,345 A * | 12/1973 | Barnes | F01D 25/18 184/6.4 |
| 4,342,489 A * | 8/1982 | Lenz | F16C 33/6659 184/6.11 |
| 4,378,197 A * | 3/1983 | Cattaneo | F01D 25/18 184/6.11 |
| 4,542,623 A * | 9/1985 | Hovan | F01D 25/125 165/51 |
| 7,372,175 B2 | 5/2008 | Bouiller et al. | |
| 10,174,629 B1 * | 1/2019 | Valva | F01D 17/02 |
| 2013/0283757 A1 * | 10/2013 | Bordne | F01D 25/125 60/39.08 |
| 2018/0087404 A1 | 3/2018 | Lighty | |

* cited by examiner

*Primary Examiner* — Phillip A Johnson
(74) *Attorney, Agent, or Firm* — Norton Rose Fulbright Canada LLP (57) ABSTRACT

A bearing chamber configuration that favorably directs the flow of oil/air mixture inside the bearing chamber of a gas turbine engine is disclosed. The bearing chamber includes an annular baffle surrounding a rotatable shaft. The baffle comprises an annular groove facing radially inwardly and a first radially-inner annular surface extending axially from a first side of the annular groove. The first radially-inner annular surface of the baffle cooperating with the shaft to define a first space inside the bearing chamber and adjacent the seal. The first space is circumferentially uniform.

20 Claims, 12 Drawing Sheets

BAFFLE FOR INSTALLATION INSIDE A BEARING CHAMBER OF A GAS TURBINE ENGINE

TECHNICAL FIELD

The disclosure relates generally to gas turbine engines, and more particularly to bearing chambers of gas turbine engines.

BACKGROUND

Gas turbine engines comprise one or more rotatable shafts that rotate at relatively high speeds and that are supported by bearings. The bearings are generally disposed inside bearing chambers and require lubrication and cooling, each of which can be provided by supplying oil to the bearings. Suitable seals can be circumferentially disposed about the rotatable shaft(s) in order to segregate certain regions such as bearing chambers to hinder the leakage of oil out of the bearing chambers.

SUMMARY

In one aspect, the disclosure describes a gas turbine engine comprising:
a shaft having a rotation axis;
a bearing disposed inside an annular bearing chamber, the bearing rotatably supporting the shaft;
a seal extending around the shaft and defining a sealing interface between an interior of the bearing chamber and an exterior of the bearing chamber; and
an annular baffle disposed inside the bearing chamber and surrounding the shaft, the baffle comprising an annular groove facing radially inwardly and a first radially-inner annular surface extending axially from a first side of the groove, the first radially-inner annular surface of the baffle cooperating with the shaft to define a first space inside the bearing chamber and adjacent the seal, the first space being circumferentially uniform.

The gas turbine engine may comprise an oil delivery port integrated with the baffle. The oil delivery port may be configured to inject oil inside the bearing chamber.

The first radially-inner annular surface may have an axial cross-sectional profile comprising a first linear portion that slopes toward the groove relative to the rotation axis.

The baffle may comprise a second radially-inner annular surface extending axially from a second side of the groove opposite the first side of the groove.

The second radially-inner annular surface may have an axial cross-sectional profile comprising a second linear portion that is non-parallel to the rotation axis.

The second linear portion may slope toward the groove relative to the rotation axis.

The gas turbine engine may comprise an oil delivery port defined in the second radially-inner annular surface.

The groove of the baffle may be axially aligned with a step formed on the shaft.

The baffle may comprise a drain hole extending therethrough and the drain hole being formed in the groove.

The first radially-inner annular surface may have an axial length that is between about 10% and about 90% of a total axial length of the baffle.

The first radially-inner annular surface may have an axial length that is between about 25% and about 60% of a total axial length of the baffle.

The baffle may be disposed between the first space and a second space inside the bearing chamber. The second space may be disposed radially outwardly from the first space.

The first radially-inner annular surface may have an axial cross-sectional profile comprising a first linear portion defining at least a majority of the radially-inner annular surface. The second radially-inner annular surface may have an axial cross-sectional profile comprising a second linear portion defining at least a majority of the radially-inner annular surface. The first linear portion may be non-parallel to the second linear portion.

The shaft may be configured to rotate relative to the baffle.

Embodiments can include combinations of the above features.

In another aspect, the disclosure describes an annular baffle for installation inside a bearing chamber of a gas turbine engine where the bearing chamber houses a bearing rotatably supporting a rotatable shaft and the baffle surrounds the shaft. The baffle comprises:
an annular groove having a central axis that corresponds to a rotational axis of the shaft during use, the groove facing radially inwardly; and
a first radially-inner annular surface extending axially from a first side of the groove; and
a second radially-inner annular surface extending axially from a second side of the groove opposite the first side of the groove.

The baffle may comprise an oil delivery port formed in the second radially-inner annular surface.

The first radially-inner annular surface may have an axial cross-sectional profile comprising a first linear portion that slopes toward the groove relative to the central axis.

The second radially-inner annular surface may have an axial cross-sectional profile comprising a linear portion that is non-parallel to the central axis.

The second linear portion may slope toward the groove relative to the central axis.

The baffle may comprise a drain hole formed in the groove.

The first radially-inner annular surface may have an axial cross-sectional profile comprising a first linear portion defining at least a majority of the radially-inner annular surface. The second radially-inner annular surface may have an axial cross-sectional profile comprising a second linear portion defining at least a majority of the radially-inner annular surface. The first linear portion may be non-parallel to the second linear portion.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes bearing chambers of gas turbine engines where the bearing chambers are configured to reduce the potential for oil leakage out of seals of such bearing chambers. In various embodiments, an annular baffle is disposed inside the bearing chamber to favorably affect the movement of the oil/air mixture inside the bearing chamber. For example, the presence of the baffle can reduce or eliminate circumferential static pressure fluctuations at the sealing interface with the shaft that can counteract the average pressure across the seal available for pressurization and potentially cause local flow reversal and oil leakage. In some embodiments, the annular baffle can cooperate with the shaft to define a circumferentially uniform space between the baffle and the rotating shaft. The circumferentially uniform space can allow the development of a high velocity uniform flow approximating a free vortex around the shaft which provides an advantageous flow pattern and lower pressure at the shaft/seal interface.

Aspects of various embodiments are described through reference to the drawings.

Figure 1:
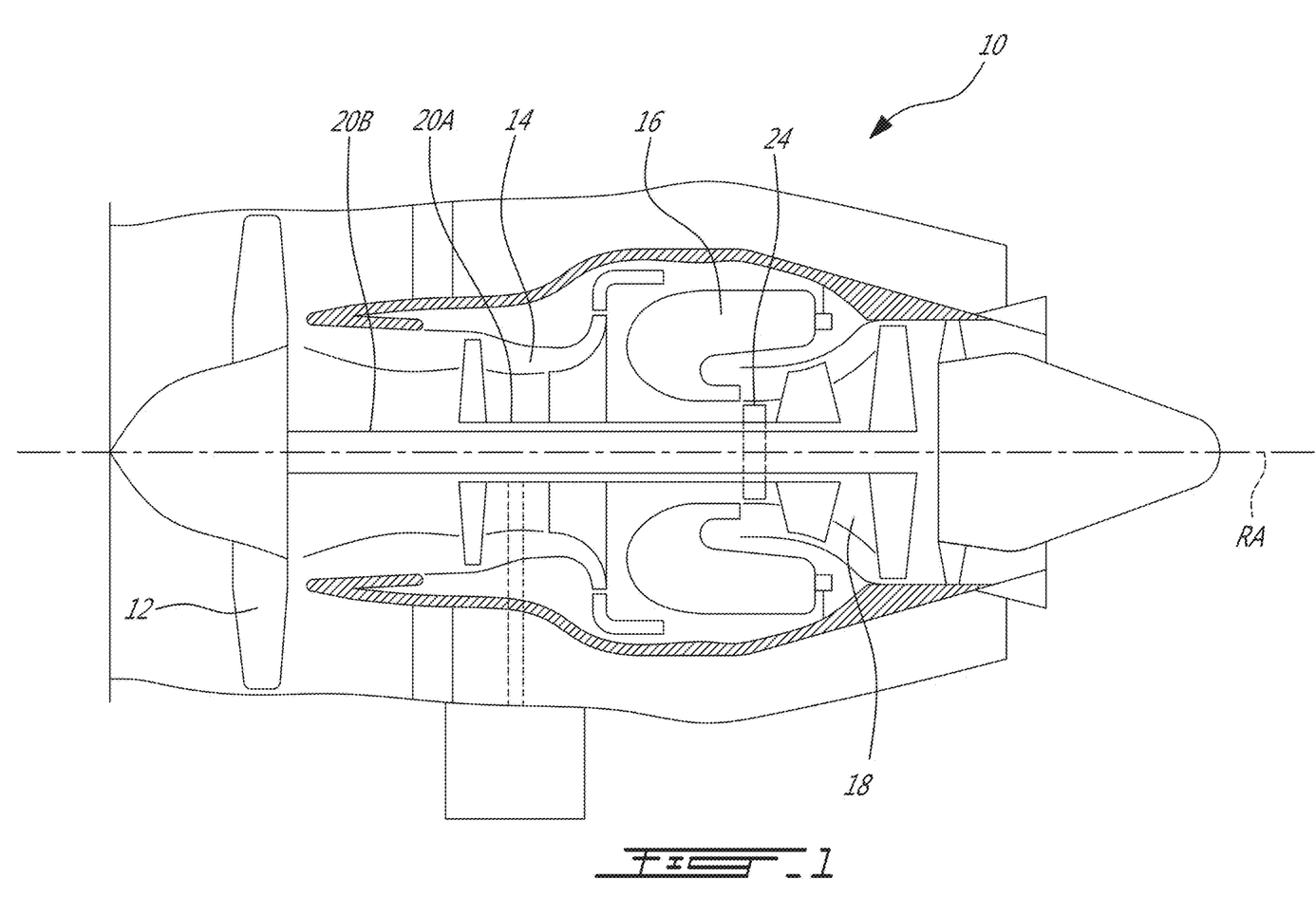
FIG. 1 is a schematic axial cross-section view of an exemplary gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Gas turbine engine 10 may suitable for mounting to and propelling an (e.g., fixed-wing or rotary wing) aircraft. Alternatively, gas turbine engine 10 may be configured as an auxiliary power unit (APU) for use on an aircraft, or, gas turbine engine 10 may be used for a ground-based industrial application such as power generation.

In various embodiments, gas turbine engine 10 can have a dual-spool configuration but it is understood that gas turbine engine 10 may not be limited to such configuration. For example, gas turbine engine 10 may comprise a high-pressure spool including high-pressure shaft 20A one or more stages of multistage compressor 14 and one or more turbines of turbine section 18. Gas turbine engine 10 may also comprise a low-pressure spool including low-pressure shaft 20B including one or more stages of multistage compressor 14 and one or more turbines of turbine section 18. Low-pressure shaft 20B may be drivingly coupled to fan 12.

Gas turbine engine 10 may comprise a central axis which may correspond to an axis of rotation RA of high-pressure shaft 20A and/or of low-pressure shaft 20B. Gas turbine engine 10 may comprise one or more bearings 24 suitable for rotatably supporting a shaft (e.g., high-pressure shaft 20A or low-pressure shaft 20B) for rotation about rotational axis RA or some other axis. In some embodiments, bearings 24 may be roller bearings.

Figure 2:
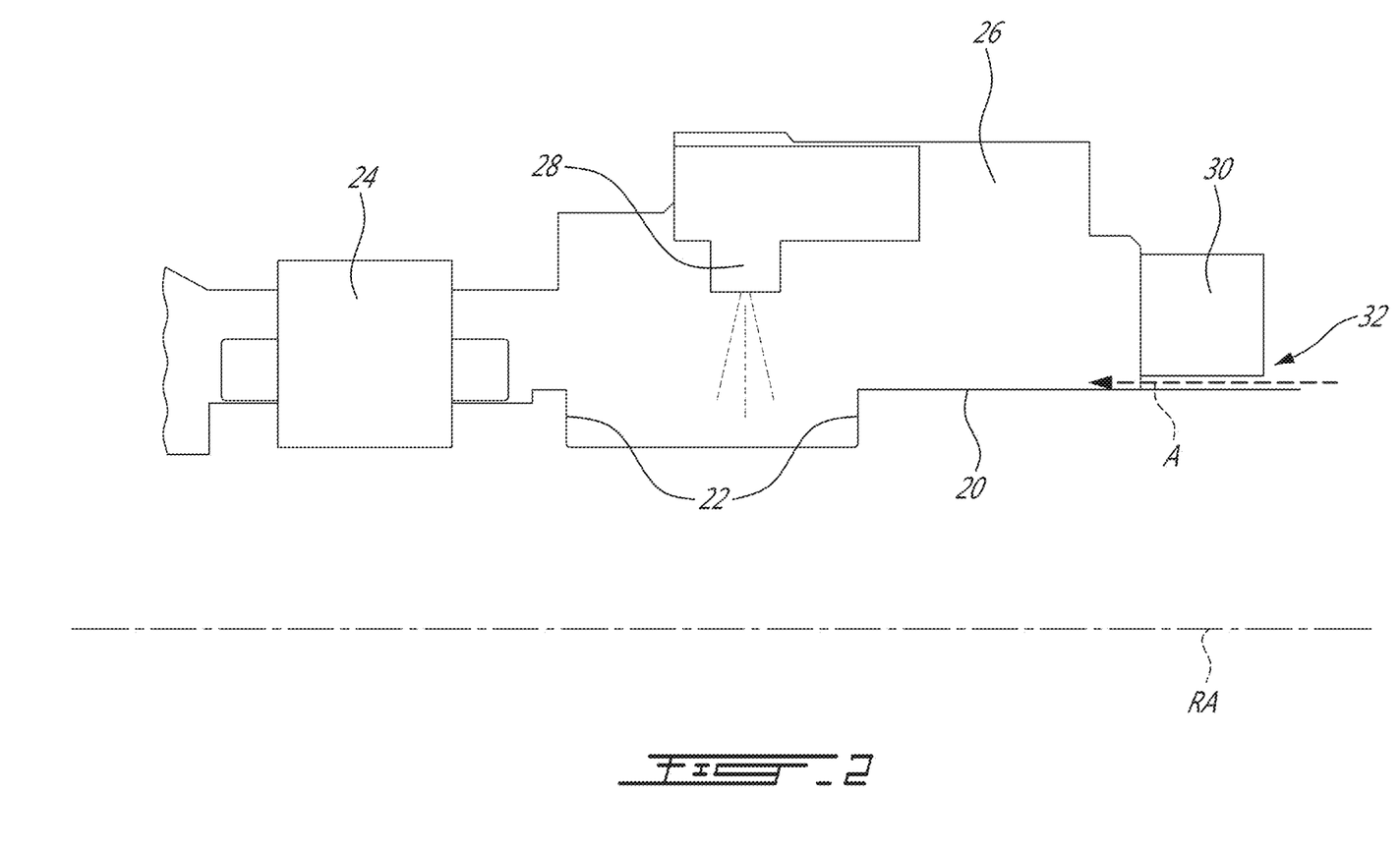
FIG. 2 is a schematic axial cross-sectional view of an exemplary bearing chamber of a baseline configuration of the gas turbine engine of FIG. 1.

FIG. 2 is a schematic upper axial cross-sectional view of an exemplary baseline configuration of bearing chamber 26 associated with bearing 24 of gas turbine engine 10. Bearing chamber 26 can extend circumferentially about high- and/or low-pressure shafts 20A, 20B (referenced hereinafter as "shaft 20"). Bearing 24 can be disposed inside bearing chamber 26. Shaft 20 can comprise one or more steps 22 on an outer surface thereof. Such steps 22 can represent a change in outer diameter of shaft 20. In some embodiments, such steps 22 can be a relatively sudden increase or decrease in outer diameter of shaft 20. Such steps 22 can be disposed inside of bearing chamber 26.

One or more oil nozzles 28 can be disposed inside of bearing chamber 26 for delivering oil to bearing 24 for lubrication and cooling purposes. Oil nozzle(s) 28 can be in communication with a source of oil (not shown). Oil nozzle(s) 28 can be disposed in an upper portion of bearing chamber 26. Bearing chamber 26 can also comprise one or more drains (referred hereinafter in the singular) in fluid communication with a scavenge line (not shown) of an oil system of gas turbine engine 10 for filtering and reusing the oil. Such drain can be located in a lower portion of bearing chamber 26 so that oil injected into an upper portion of bearing chamber 26 can eventually flow to the lower portion of bearing chamber 26 due to the influence of gravity and then exit bearing chamber 26 via the drain.

Seal 30 can extend around shaft 20 and cooperate with the rotatable shaft to define a sealing interface 32 between an interior of bearing chamber 26 and an exterior of bearing chamber 26. Seal 30 may be a mechanical seal ring that is used to seal the clearance between the rotating shaft 20 and the stationary housing of bearing chamber 26. Seal 30 can be referred to as a "shaft seal". Seal 30 can be of the type known as a "carbon seal". In some embodiments, seal 30 can comprise a face seal that can contain a carbon-graphite stationary ring and a silicon carbide or tungsten carbide rotating ring. The rings that make the dynamic face seal can be held together with springs or magnets so that liquids cannot flow between the ring faces, even though they are spinning against each other at high rotational speed. In some embodiments, seal 30 can comprise a labyrinth seal. Aspects of the present disclosure are not limited to any specific type of seal 30.

Even though seal 30 is described to define a sealing interface, it is understood that such sealing interface may not necessarily comprise a contact and hermetic sealing interface. For example, depending on the type of seal 30 used, such sealing interface can be designed to permit some leakage. In some embodiments, a pressure differential can be provided across seal 30 (e.g., using pressurized air) so that an exterior of bearing chamber 26 has a higher pressure than an interior of bearing chamber 26. Such pressure differential can cause some air to flow into bearing chamber 26 at sealing interface 32 along the arrow A. Such inward flow of air entering bearing chamber 26 can prevent outward flow of oil out of bearing chamber 26 via seal 30. The air entering bearing chamber 26 can exit bearing chamber 26 with the oil via the drain for example and subsequently be separated from the oil by the oil system of engine 10.

Figure 3:
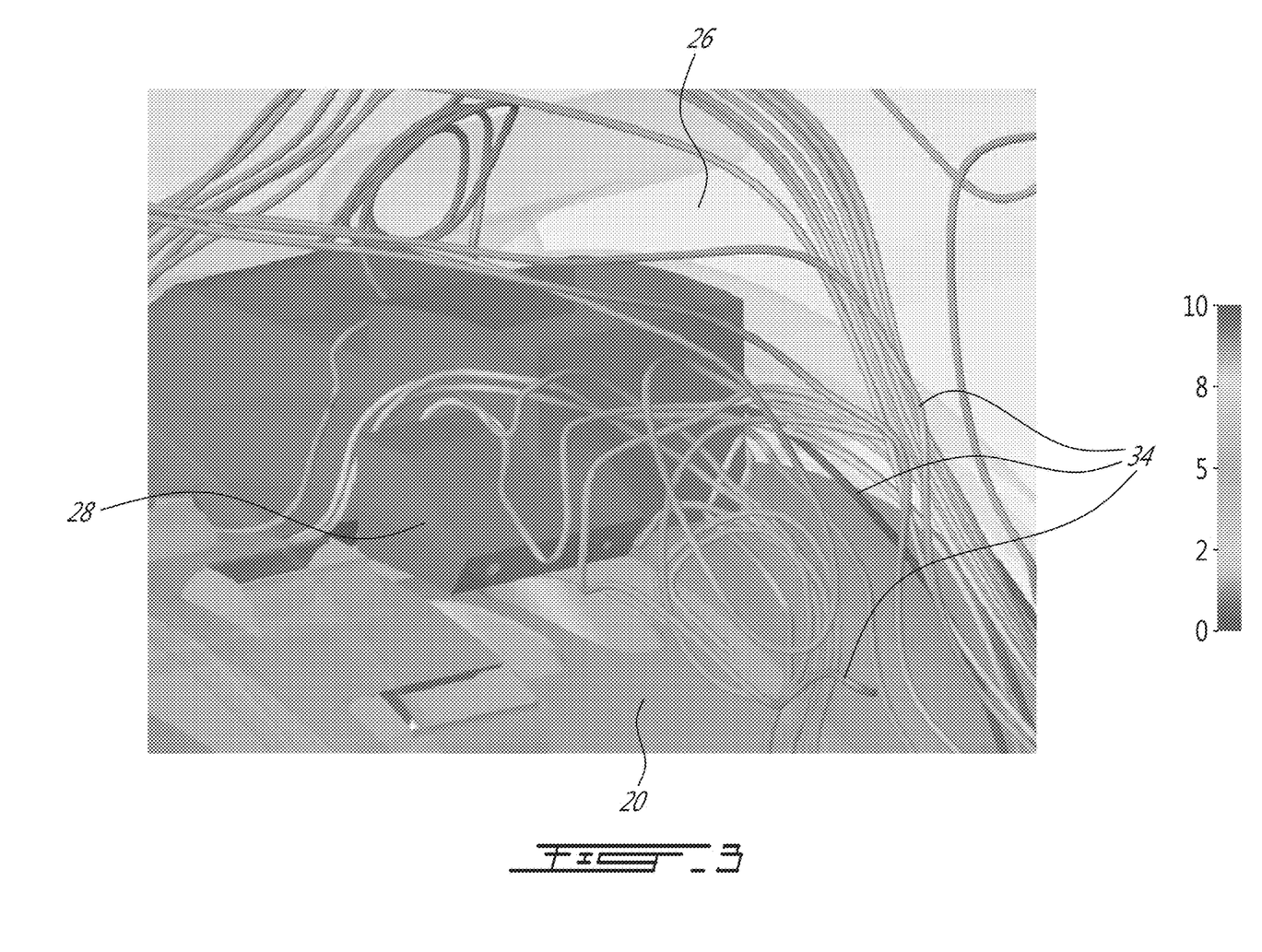
FIG. 3 is a perspective view of an upper portion of the bearing chamber of FIG. 2 showing flow lines of an oil/air mixture inside the bearing chamber.

FIG. 3 is a perspective view of a portion of the baseline configuration of bearing chamber 26 of FIG. 2 showing flow lines 34 of the oil/air mixture inside bearing chamber 26. During the operation of engine 10, the relatively fast rotation of shaft 20 can induce a flow of oil/air mixture inside bearing chamber 26. The induced flow can generally flow around shaft 20 and along bearing chamber 26 that extends around shaft 20. However, the presence of intermittent obstacles such as oil nozzle(s) 28 inside bearing chamber 26 disrupts the flow of the oil/air mixture and can cause an uneven pressure distribution in bearing chamber 26. In other words, the baseline configuration of bearing chamber 26 provides an annular path extending around shaft 20 that is not circumferentially uniform. Flow lines 34 of FIG. 3 show tangled (e.g., disorganized) flow paths of the oil/air mixture flowing around oil nozzle(s) 28 disposed inside of bearing chamber 26. The different shade of flow lines represent different velocity magnitudes. Flow lines 34 were computed using computational fluid dynamics (CFD) software.

Figure 4:
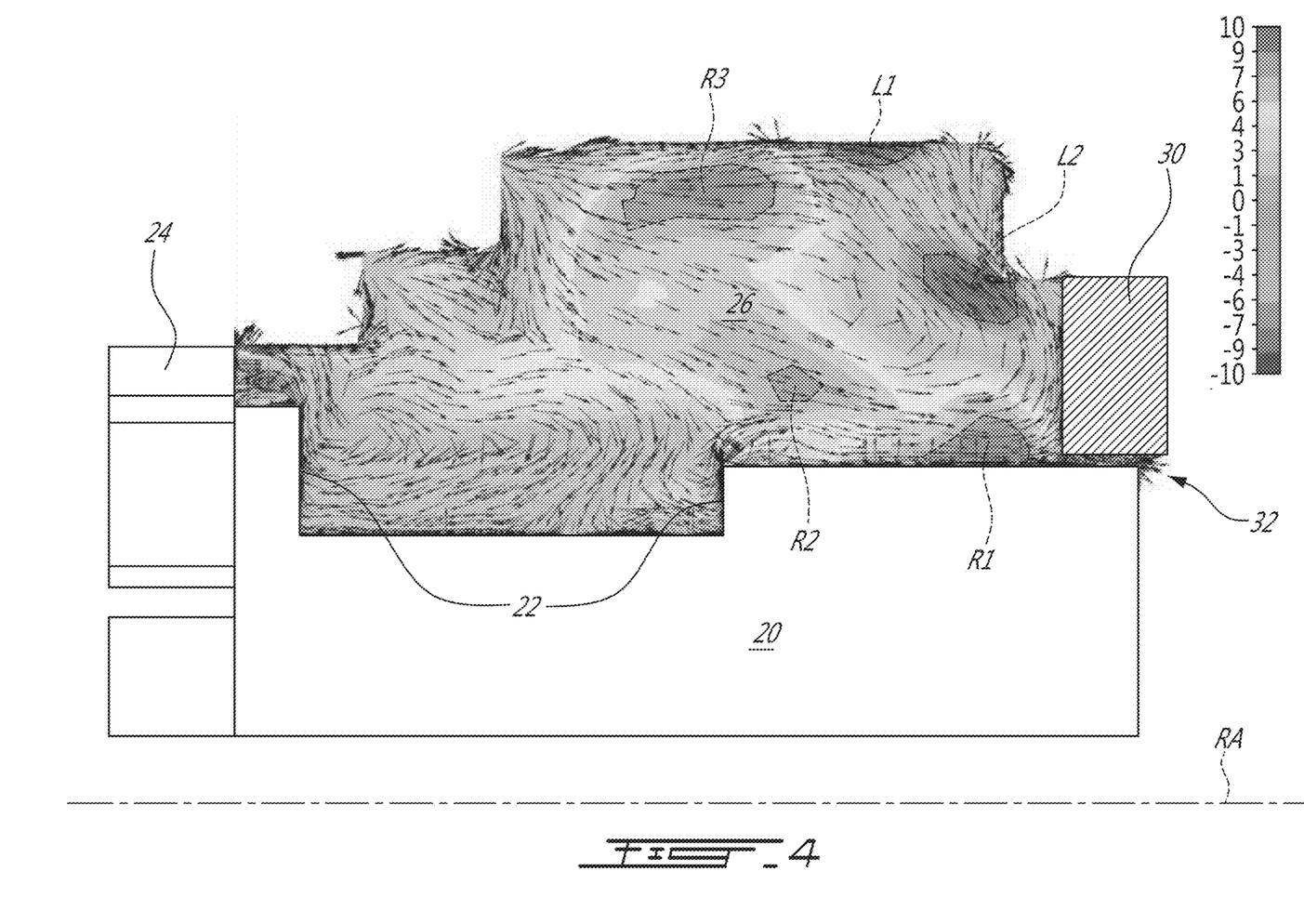
FIG. 4 is a schematic axial cross-sectional view of the bearing chamber of FIG. 2 with a planar velocity plot of the oil/air mixture.

FIG. 4 is a schematic axial cross-sectional view of the baseline configuration of bearing chamber 26 with a planar velocity plot of the oil/air mixture in the axial direction (i.e., along rotation axis RA). The situation illustrated in FIG. 4 corresponds to the situation illustrated in FIG. 3. During operation of engine 10, the velocity of the oil/air mixture in the circumferentially open bearing chamber 26 can be much higher in the circumferential direction around shaft 20. However, the intermittent obstacles to the flow of oil/air mixture in bearing chamber 26 can disrupt the flow of the oil/air mixture as shown in FIG. 3 and there can be some movement of the oil/air mixture in the axial direction also. Different shades in the velocity plot of FIG. 4 represent different velocities of the oil/air mixture in the axial direction. Positive velocities represent velocities in the right direction and negative velocities represent velocities in the left direction relative to FIG. 4. Regions R1, R2 and R3 are regions where the velocity of the oil/air mixture in the right direction is relatively high. Regions L1 and L2 are regions where the velocity of the oil/air mixture in the left direction is relatively high. Region R1 can be of particular importance because it is located near sealing interface 32 and represents a flow of oil/air mixture heading toward sealing interface 32.

Since the cross-sectional area of bearing chamber 26 is not circumferentially uniform about rotation axis RA, it is understood that the configuration of the velocity plot of FIG. 4 also may not be circumferentially uniform about rotation axis RA. However, the presence of regions such as R1 near seal 30 can cause local increases in pressure on the inside of sealing interface 32 which can counteract the sealing pressure differential present across seal 30. If such local increases in pressures exceed the average sealing pressure across seal 30, leakage of oil in such regions of seal 30 could potentially occur. The velocity plot of FIG. 4 was computed using CFD software. The small arrows superimposed on the velocity plot/map are planar vectors that are tangent to the specific plane shown that is parallel to rotation axis RA, and indicate the direction of flow of the oil/air mixture in the plane shown.

Figure 5:
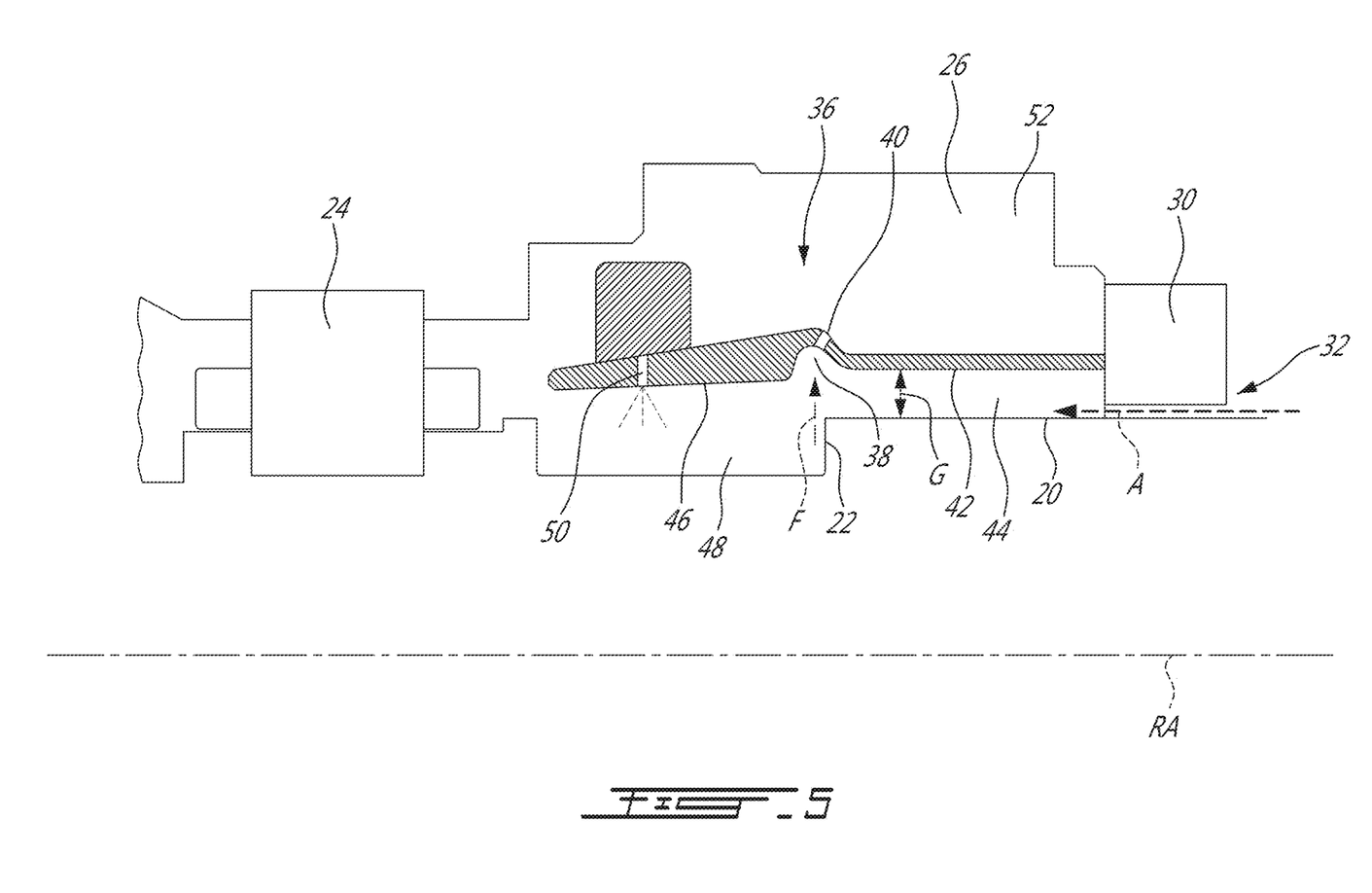
FIG. 5 is a schematic axial cross-sectional view of an exemplary bearing chamber having a modified configuration for the gas turbine engine of FIG. 1.

FIG. 5 is a schematic axial cross-sectional view of bearing chamber 26 with a modified configuration. Bearing chamber 26 can comprise baffle 36 disposed therein. Baffle 36 can serve to favorably alter the flow of the oil/air mixture inside of bearing chamber 26 to reduce the potential for leakage out of seal 20. Baffle 36 can have an annular shape and surround shaft 20. Baffle 36 can comprise annular groove 38 facing radially inwardly and also surrounding shaft 20. Baffle 36 can be positioned so that groove 38 is axially aligned with step 22 of shaft 20. Baffle 36 can be installed as a separate component into bearing chamber 26 by way of retrofitting or can be an integral part of a housing of bearing chamber 26. Baffle 36 can be secured to stationary structure (e.g., housing of bearing chamber) of engine 10 so that baffle 36 can be stationary with respect to rotating shaft 20. In other words, baffle 36 can be installed so that baffle 36 does not rotate with shaft 20.

During rotation of shaft 20, oil that comes into contact with shaft 20 can be flung radially outwardly as shown schematically by arrow F. Accordingly, groove 38 can serve as a catchment for the oil that is flung outwardly from step 22 of shaft 20 and thereby reduce splashing in the space below baffle 36. Baffle 36 can comprise one or more drain holes 40 extending therethrough to permit oil to pass from a lower side of baffle 36 to an upper side of baffle 36 (e.g., due to the pressure difference shown in FIG. 12). In some embodiments, drain hole(s) 40 can be disposed at the location of groove 38 so that oil that is collected in groove 38 can drain via drain holes 40. In some embodiments, a plurality of drain holes 40 can be circumferentially distributed about baffle 36. One or more drain holes 40 formed in a lower portion of baffle 36 can permit the oil to drain from baffle 36 when the operation of engine 10 is stopped. One or more drain holes 40 can be formed at locations other than in groove 38. For example, one or more drain holes 40 can be formed in radially-inner annular surface 42.

Baffle 36 can comprise first radially-inner annular surface 42 extending axially from a first (e.g., right) side of groove 38. First radially-inner annular surface 42 of baffle 36 can cooperate with shaft 20 to define first space 44 inside bearing chamber 26 and adjacent seal 30. First space 44 defined between baffle 36 and the corresponding portion of shaft 20 can be circumferentially uniform. In other words, first space 44 can have an axial cross-sectional profile that is substantially the same at all angular orientations about rotation axis RA. Accordingly, the circumferentially uniform first space 44 can be free of intermittent obstacles that disrupt the rotational flow of the oil/air mixture that is induced by the rotation of shaft 20.

Baffle 36 can comprise second radially-inner annular surface 46 extending axially from a second (e.g., left) side of annular groove 38 opposite the first side of annular groove 38. Second radially-inner annular surface 46 of baffle 36 can cooperate with shaft 20 to define second space 48 inside bearing chamber 26 and distal of seal 30. Second space 48 defined between baffle 36 and the corresponding portion of shaft 20 can be circumferentially uniform. In other words, second space 48 can have an axial cross-sectional profile that is substantially the same at all angular orientations about rotation axis RA. Accordingly, the circumferentially uniform second space 48 can be free of intermittent obstacles that disrupt the rotational flow of the oil/air mixture that is induced by the rotation of shaft 20.

In some embodiments, oil nozzle 28 can be integrated with baffle 36. For example, second annular surface 46 can comprise one or more oil delivery ports 50 (referred hereinafter in the singular) integrated with annular baffle 36. Oil delivery port 50 can be in communication with a source of oil and configured to inject oil inside bearing chamber 26 for cooling and lubricating bearing 24. Oil delivery port 50 can be disposed in an upper portion of annular baffle 36 and of bearing chamber 26.

Baffle 36 can be disposed between a lower portion of bearing chamber 26 defined by first space 44 and second space 48, and an upper portion 52 (i.e., space) of bearing chamber 26 where upper portion 52 is disposed radially outwardly from the lower portion. Baffle 36 can be disposed to at least partially extend axially between bearing 24 and seal 30. In some embodiments, first annular surface 42 can extend axially substantially up to seal 30 to favorably affect the flow conditions of the oil/air mixture in proximity to sealing interface 32. In some embodiments, first annular surface 42 (or part thereof) can be disposed at a distance G from shaft 20. In some embodiments, distance G can be a function (e.g., between 100% and 150%) of the diameter of shaft 20.

Figure 6A:
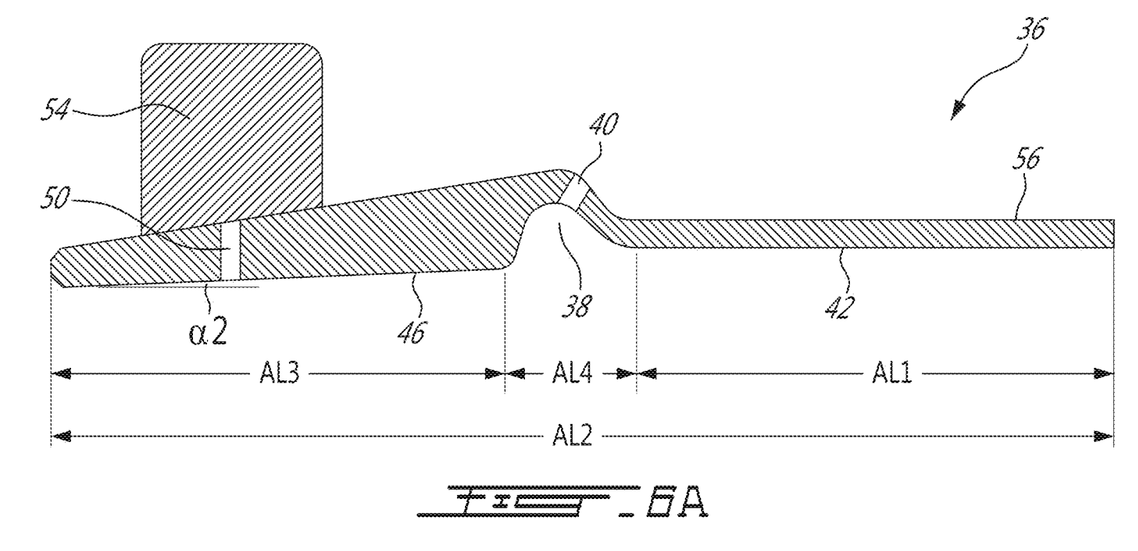
FIG. 6A is an axial cross-sectional view of an upper portion of a baffle of the bearing chamber of FIG. 5 according to one embodiment.
Figure 7:
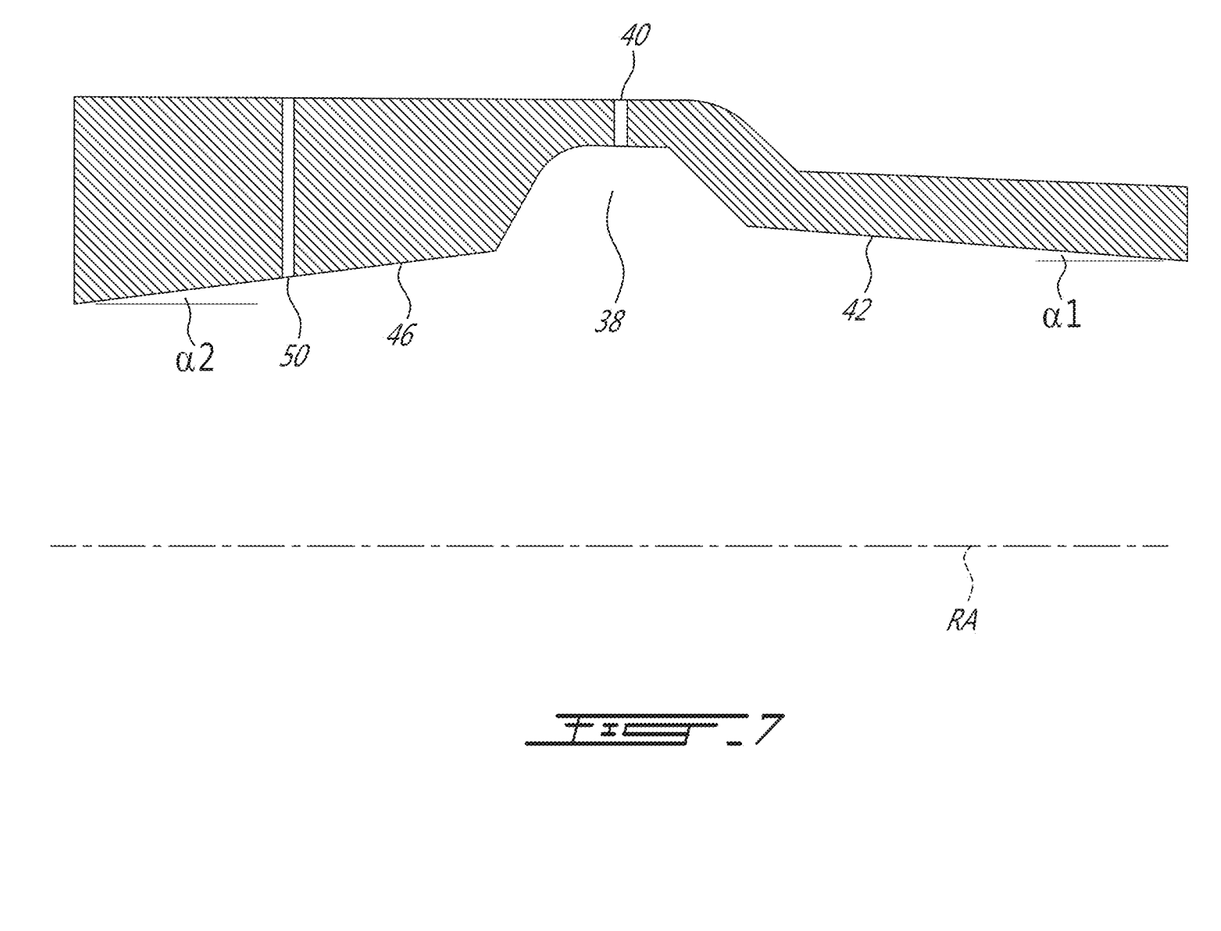
FIG. 7 is an axial cross-sectional view of an upper portion of a baffle of the bearing chamber of FIG. 5 according to another embodiment.

FIG. 6A is an axial cross-sectional view of an upper portion of baffle 36. First radially-inner annular surface 42 can have an axial cross-sectional profile that is generally linear. For example, a majority of the axial cross-section profile of first radially-inner surface 42 can be linear. In some embodiments, the linear portion of first radially inner surface 42 can be substantially parallel to the facing surface of shaft 20. In some embodiments, the linear portion of first radially inner surface 42 can be substantially parallel to rotation axis RA. In some embodiments, the linear portion of first radially inner surface 42 can be non-parallel (e.g., oblique) to rotation axis RA and/or to the facing surface of shaft 20. In some embodiments, the linear portion of first radially inner surface 42 can slope toward groove 38 relative to rotation axis RA as shown in FIG. 7.

Second radially-inner annular surface 46 can have an axial cross-sectional profile that is generally linear. For example, a majority of the axial cross-section profile of second radially-inner surface 46 can be linear. In some embodiments, the linear portion of second radially inner surface 46 can be non-parallel (e.g., oblique) to rotation axis RA and/or to the facing surface of shaft 20. In some embodiments, the linear portion of second radially inner surface 46 can slope toward groove 38 relative to rotation axis RA (e.g., see angle α2).

The sloping of first radially-inner surface 42 and/or of second radially-inner surface 46 of baffle 36 toward groove 38 can cause oil that comes into contact with baffle 36 to be directed toward annular groove 38. In some embodiments, the linear portion first radially-inner surface 42 and the linear portion of second radially-inner surface 46 can be non-parallel.

In some embodiments, first radially-inner annular surface 42 can have an axial length AL1 that is between about 10% and about 90% of a total axial length AL2 of baffle 36. In some embodiments, first radially-inner annular surface 42 can have an axial length AL1 that is between about 25% and about 60% of a total axial length AL2 of baffle 36. In some embodiments, second radially-inner annular surface 46 can have an axial length AL3 that is between about 10% and about 90% of a total axial length AL2 of baffle 36. In some embodiments, second radially-inner annular surface 46 can have an axial length AL3 that is between about 25% and about 60% of a total axial length AL2 of baffle 36. In some embodiments, first radially-inner annular surface 42 can have an axial length AL1 that is about the same as the axial length AL3 of second radially-inner annular surface 46. Groove 38 can have an axial length AL4.

In some embodiments, radially-outer surface 56 of baffle 36 can be circumferentially uniform or can be circumferentially non-uniform. For example, ribs or other type(s) of stiffeners could be disposed on radially-outer surface 56 or on other radially-outer portion of baffle 36 to help prevent flutter.

Figure 6B:
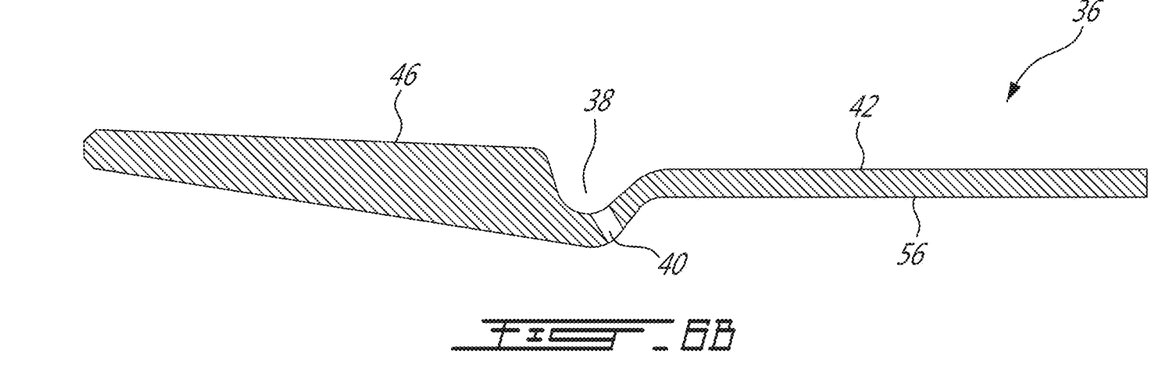
FIG. 6B is an axial cross-sectional view of a lower portion of the baffle of FIG. 6A.

FIG. 6B is an axial cross-sectional view of a lower portion of baffle 36. The lower portion of baffle 36 can have a generally similar cross-sectional profile as the upper portion of baffle 36 except for the absence of oil delivery port 50 and associated manifold structure 54.

FIG. 7 is an axial cross-sectional view of an upper portion of an exemplary baffle 36 of bearing chamber 26 of FIG. 5 according to another embodiment. Some elements of the baffle 36 of FIG. 7 are common with the baffle 36 of FIGS. 6A and 6B and like elements and labeled using like reference numbers. Even though it is not shown in FIG. 7, the baffle 36 of FIG. 7 could incorporate manifold structure 54 in some embodiments. As illustrated in FIG. 7, the linear portion of first radially inner surface 42 can be non-parallel (e.g., oblique) to rotation axis RA. In some embodiments, the linear portion of first radially inner surface 42 can slope toward groove 38 relative to rotation axis RA (e.g., see angle α1). As illustrated in FIG. 7, first radially inner surface 42 or a linear portion thereof can define a conical surface. Second radially inner surface 46 or a linear portion thereof can also define a conical surface. Accordingly, groove 38 can be located between two conical surfaces that are each sloped to direct oil toward groove 38.

Figure 8:
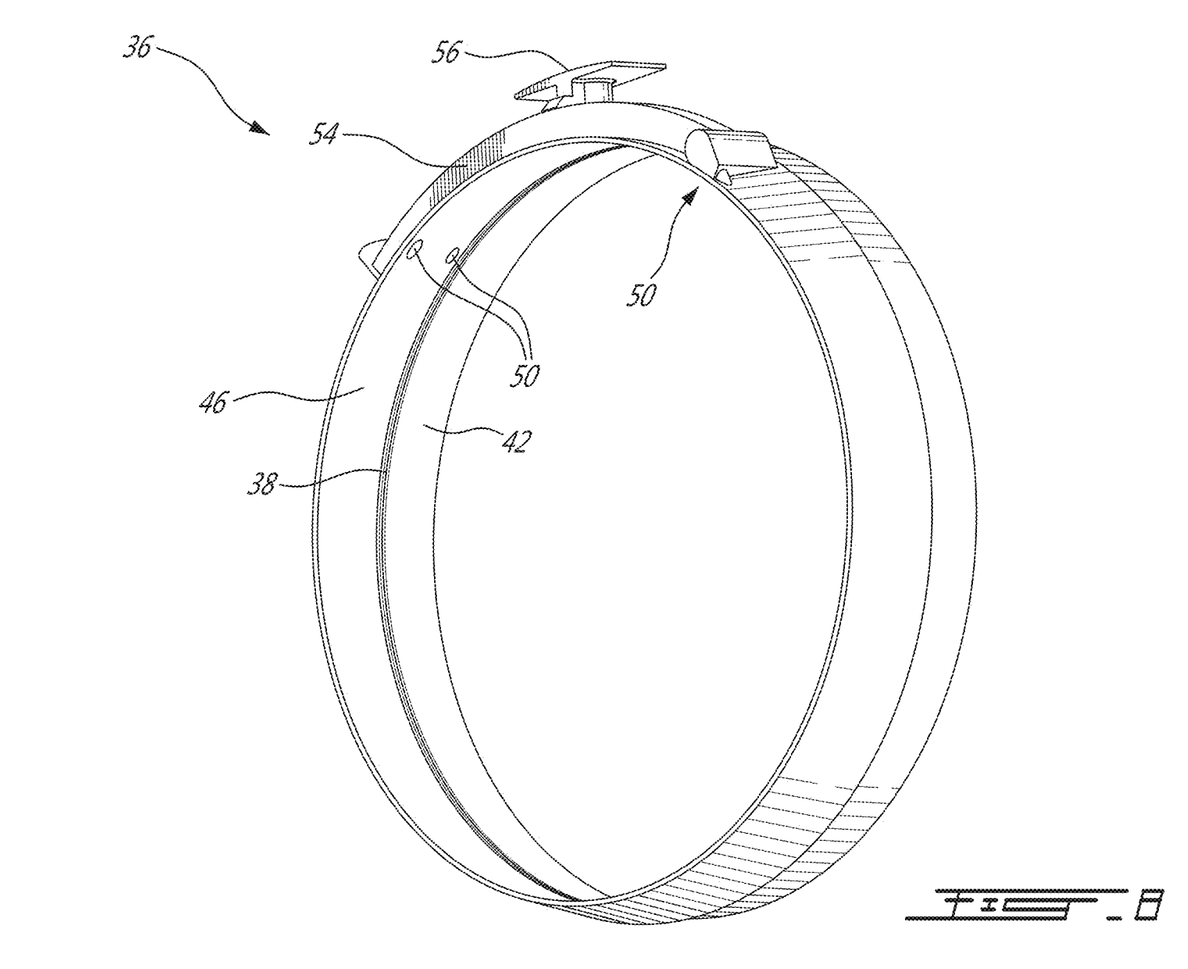
FIG. 8 is a perspective view of an exemplary baffle of the bearing chamber of FIG. 5.

FIG. 8 is a perspective view of an exemplary baffle 36 of bearing chamber 26 of FIG. 5. Baffle 36 can have a generally annular shape and configured to surround shaft 20. Baffle 36 can have integrated oil nozzles in the form of one or more oil delivery ports 50 for delivering oil into bearing chamber 26. Oil delivery ports 50 can be in communication with oil inlet 56 via manifold structure 54. During operation, oil inlet 56 can be in fluid communication with a source of oil of engine 10. Baffle 36 can be made from a metallic material suitable for service inside bearing chamber 26. Baffle 36 can be made by machining, casting and/or other suitable manufacturing process(es).

Figure 9:
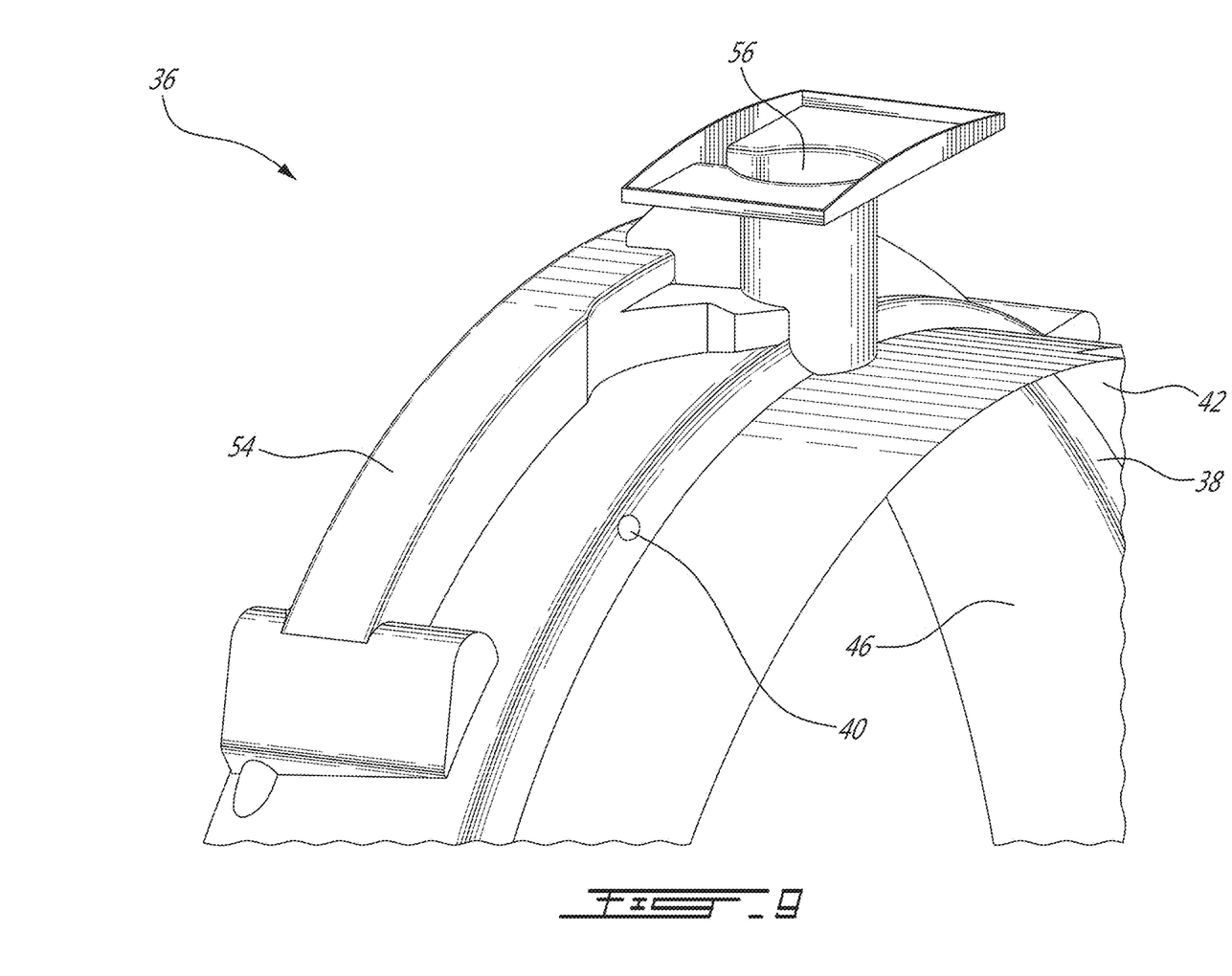
FIG. 9 is an enlarged perspective view of an upper portion of the baffle of FIG. 8.

FIG. 9 is an enlarged perspective view of an upper portion of baffle 36. FIG. 9 illustrates manifold structure 54 and oil inlet 56. Manifold structure 54 can contain one or more internal passages for directing oil from oil inlet 56 to oil delivery ports 50.

Figure 10:
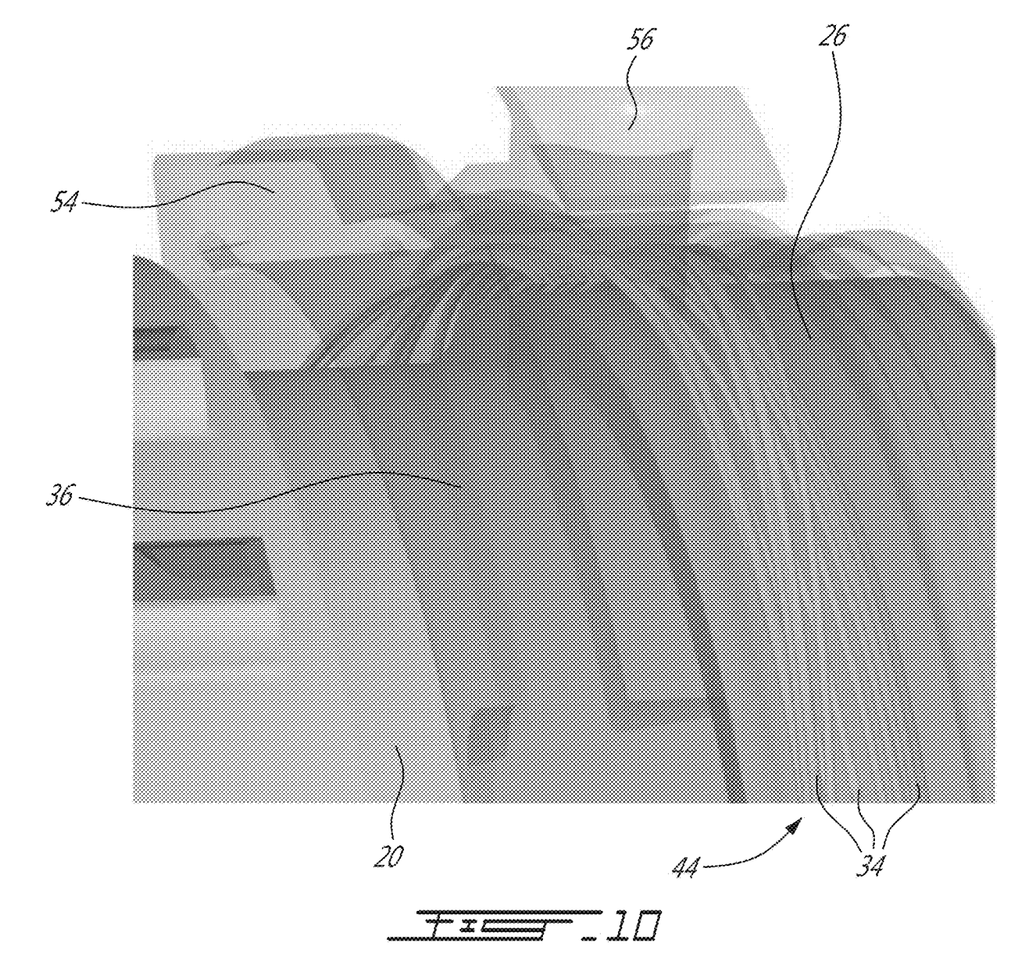
FIG. 10 is a perspective view of a portion of the bearing chamber of FIG. 5 showing flow lines of the oil/air mixture inside the bearing chamber.

FIG. 10 is a perspective view of an upper portion of bearing chamber 26 of FIG. 5 showing flow lines 34 of the oil/air mixture inside bearing chamber 26. Flow lines 34 shown are those in first annular space 44 disposed radially between first annular surface 42 and the facing surface of shaft 20 (see FIG. 5) and also adjacent to seal 30. Baffle 36 is shown in FIG. 10 as being partially transparent to permit visibility of flow lines 34. For the purpose of comparison with the bearing chamber of baseline configuration of FIG. 3, the portion of bearing chamber 26 shown in FIG. 10 includes manifold structure 54 and oil inlet 56.

Figure 11:
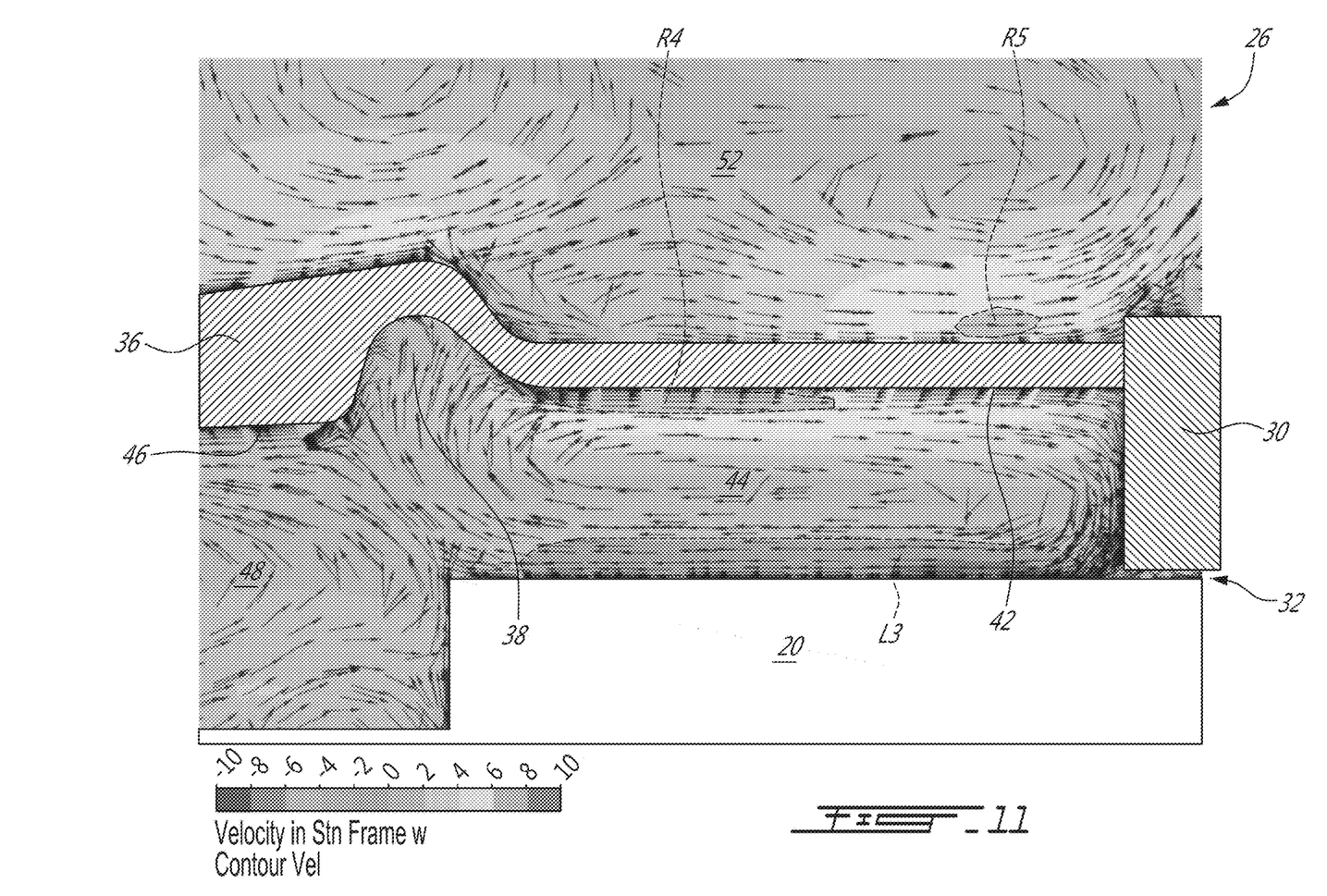
FIG. 11 is a schematic axial cross-sectional view of the bearing chamber of FIG. 5 with a planar velocity plot of the oil/air mixture.

The circumferentially uniform annular space 44 can allow the development of a high velocity uniform flow of the oil/air mixture induced by the rotation of shaft 20. The absence of obstacles disposed in annular space 44 can allow the flow of the oil/air mixture to approximating a free vortex around shaft 20 as illustrated by flow lines 34. The free vortex flow can provides an advantageous flow pattern and lower pressure at sealing interface 32 as illustrated in FIG. 11. Flow lines 34 of FIG. 10 demonstrate much less entanglement and deviations (e.g., more organized flow) than those illustrated in FIG. 3.

FIG. 11 is a schematic axial cross-sectional view of the modified configuration of bearing chamber 26 (i.e., with baffle 36) with a planar velocity plot of the oil/air mixture in the axial direction (i.e., along rotation axis RA) for comparison with that of FIG. 4. The situation illustrated in FIG. 11 corresponds to the situation illustrated in FIG. 10. Different shades in the velocity plot of FIG. 11 represent different velocities of the oil/air mixture in the axial direction. Positive velocities represent velocities in the right direction and negative velocities represent velocities in the left direction relative to FIG. 11. Regions R4 and R5 are regions where the velocity of the oil/air mixture in the right direction is relatively high. Region L3 is a region where the velocity of the oil/air mixture in the left direction is relatively high. Regions R4 and L3 illustrate a clockwise scrubbing flow of the oil/air mixture where the oil/air mixture flows away from sealing interface 32 instead of toward sealing interface 32 as shown in FIG. 4. Such flow pattern of the oil/air mixture can be advantageous in avoiding regions of elevated pressure near sealing interface 32 and thereby reducing the potential for oil leakage out of sealing interface 32. The velocity plot of FIG. 11 was computed using CFD software. The small arrows superimposed on the velocity plot/map are planar vectors that are tangent to the specific plane shown that is parallel to rotation axis RA, and indicate the direction of flow of the oil/air mixture in the plane shown.

Figure 12:
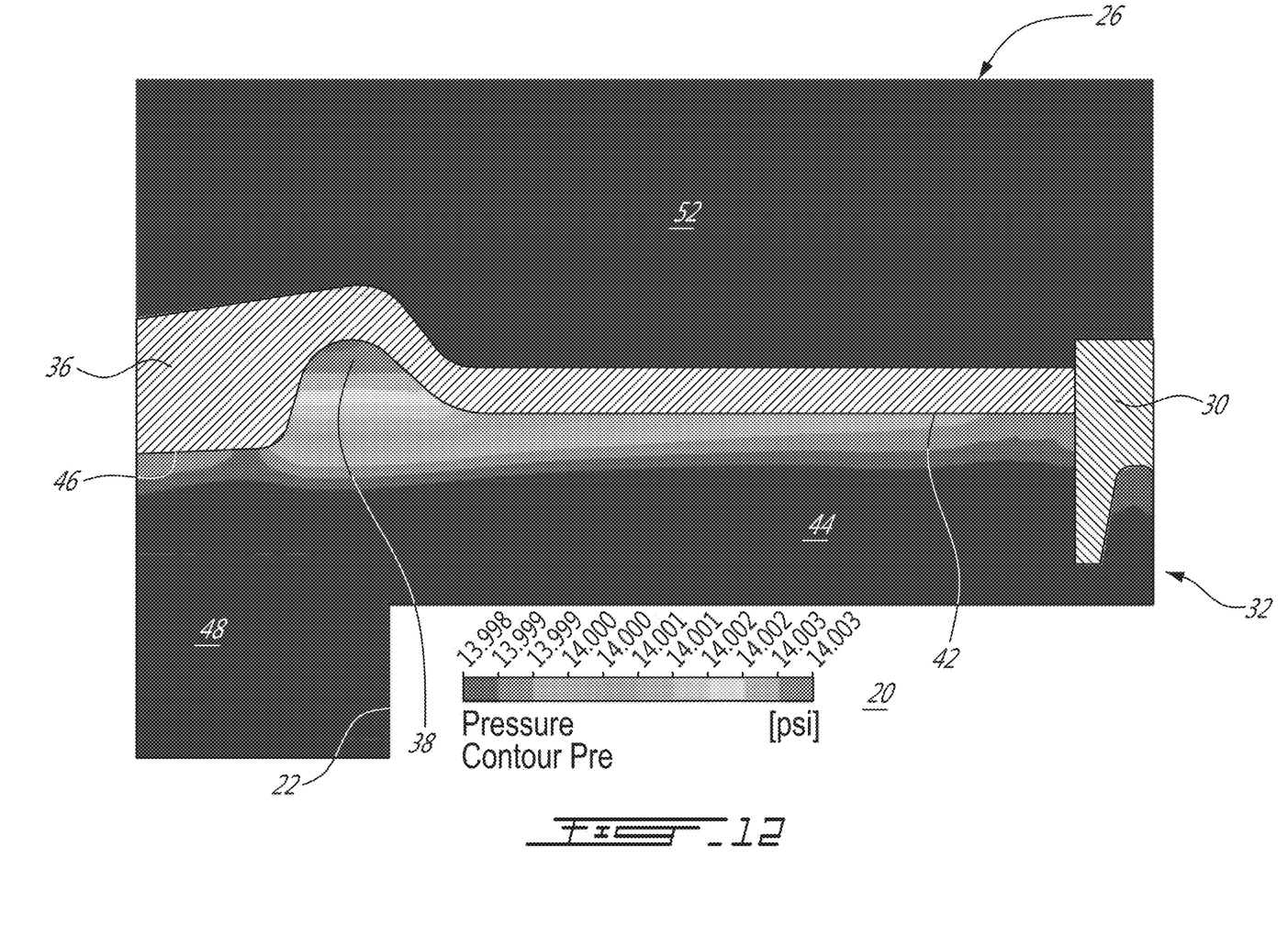
FIG. 12 is a schematic axial cross-sectional view of the modified bearing chamber of FIG. 5 with a pressure plot of the oil/air mixture.

FIG. 12 is a schematic axial cross-sectional view of the modified configuration of bearing chamber 26 (i.e., with baffle 36) with a planar pressure plot of the oil/air mixture. The situation illustrated in FIG. 12 corresponds to the situation illustrated in FIG. 11. FIG. 12 shows that pressure is the highest in groove 38, which could be attributed to the oil being collected by groove 38. As explained above, first and second radially-inner surfaces 42, 46 of baffle 36 can be sloped toward groove 38 so as to direct the oil toward groove 38. Groove 38 can also collect oil that is flung by step 22 of shaft 20. FIG. 12 also shows no region of elevated pressure adjacent sealing interface 32 in space 44 of bearing chamber 26. Instead, FIG. 12 shows a relatively uniform low pressure in spaces 44 and 48 adjacent shaft 20 and also adjacent sealing interface 32. The velocity plot of FIG. 12 was computed using CFD software.

In some embodiments, the presence and geometric configuration of baffle 36 can favorably affect the flow conditions of the oil/air mixture inside bearing chamber 26 and reduce the potential for local oil leakage out of bearing chamber 26 via sealing interface 32. In some embodiments, the desirable flow conditions provided by baffle 36 can also reduce the demand for pressurization air required by seal 30. In some embodiments, such reduction in the consumption of pressurized air can potentially improve the fuel consumption of engine 10. In some embodiments, the active collection of oil by groove 38 can reduce the density of the oil/air mixture and consequently reduce churning and heat rejection. In some embodiments, the more uniform pressure distribution in the space(s) radially inwardly of baffle 36 can improve targeting by oil delivery ports.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising:
   a shaft having a rotation axis;
   a bearing disposed inside an annular bearing chamber, the bearing rotatably supporting the shaft;
   a seal extending around the shaft and defining a sealing interface between an interior of the bearing chamber and an exterior of the bearing chamber; and
   an annular baffle disposed inside the bearing chamber and surrounding the shaft, the baffle comprising an annular groove facing radially inwardly and a first radially-inner annular surface extending axially from a first side of the groove, the first radially-inner annular surface of the baffle cooperating with the shaft to define a first space inside the bearing chamber and adjacent the seal, the first space being circumferentially uniform.

2. The gas turbine engine as defined in claim 1, comprising an oil delivery port integrated with the baffle, the oil delivery port being configured to inject oil inside the bearing chamber.

3. The gas turbine engine as defined in claim 1, wherein the first radially-inner annular surface has an axial cross-sectional profile comprising a first linear portion that slopes toward the groove relative to the rotation axis.

4. The gas turbine engine as defined in claim 1, wherein the baffle comprises a second radially-inner annular surface extending axially from a second side of the groove opposite the first side of the groove.

5. The gas turbine engine as defined in claim 4, wherein the second radially-inner annular surface has an axial cross-sectional profile comprising a second linear portion that is non-parallel to the rotation axis.

6. The gas turbine engine as defined in claim 5, wherein the second linear portion slopes toward the groove relative to the rotation axis.

7. The gas turbine engine as defined in claim 5, comprising an oil delivery port defined in the second radially-inner annular surface.

8. The gas turbine engine as defined in claim 4, wherein:
   the first radially-inner annular surface has an axial cross-sectional profile comprising a first linear portion defining at least a majority of the first radially-inner annular surface;
   the second radially-inner annular surface has an axial cross-sectional profile comprising a second linear portion defining at least a majority of the second radially-inner annular surface; and
   the first linear portion is non-parallel to the second linear portion.

9. The gas turbine engine as defined in claim 1, wherein the groove of the baffle is axially aligned with a step formed on the shaft.

10. The gas turbine engine as defined in claim 1, wherein the baffle comprises a drain hole extending therethrough, the drain hole being formed in the groove.

11. The gas turbine engine as defined in claim 1, wherein the first radially-inner annular surface has an axial length that is between 10% and 90% of a total axial length of the baffle.

12. The gas turbine engine as defined in claim 1, wherein the first radially-inner annular surface has an axial length that is between 25% and 60% of a total axial length of the baffle.

13. The gas turbine engine as defined in claim 1, wherein the baffle is disposed between the first space and a second space inside the bearing chamber, the second space being disposed radially outwardly from the first space.

14. The gas turbine engine as defined in claim 1, wherein the shaft is configured to rotate relative to the baffle.

15. An annular baffle for installation inside a bearing chamber of a gas turbine engine where the bearing chamber houses a bearing rotatably supporting a rotatable shaft and the baffle surrounds the shaft, the baffle comprising:
- an annular groove having a central axis that corresponds to a rotational axis of the shaft during use, the groove facing radially inwardly; and
- a first radially-inner annular surface extending axially from a first side of the groove; and
- a second radially-inner annular surface extending axially from a second side of the groove opposite the first side of the groove.

16. The baffle as defined in claim 15, comprising an oil delivery port formed in the second radially-inner annular surface.

17. The baffle as defined in claim 15, wherein the first radially-inner annular surface has an axial cross-sectional profile comprising a first linear portion that slopes toward the groove relative to the central axis.

18. The baffle as defined in claim 15, wherein the second radially-inner annular surface has an axial cross-sectional profile comprising a linear portion that is non-parallel to the central axis.

19. The baffle as defined in claim 18, wherein the second linear portion slopes toward the groove relative to the central axis.

20. The baffle as defined in claim 15, comprising a drain hole formed in the groove.

\* \* \* \* \*